United States Patent
Broussard

(10) Patent No.: US 10,649,410 B2
(45) Date of Patent: May 12, 2020

(54) HIGH RESOLUTION TIME-OF-FLIGHT MEASUREMENTS

(71) Applicant: Thomas Broussard, Houston, TX (US)

(72) Inventor: Thomas Broussard, Houston, TX (US)

( * ) Notice: Subject to any disclaimer, the term of this patent is extended or adjusted under 35 U.S.C. 154(b) by 35 days.

(21) Appl. No.: 15/727,413

(22) Filed: Oct. 6, 2017

(65) Prior Publication Data

US 2019/0107811 A1    Apr. 11, 2019

(51) Int. Cl.
*G04F 10/02* (2006.01)

(52) U.S. Cl.
CPC .................... *G04F 10/02* (2013.01)

(58) Field of Classification Search
CPC ....................................................... G04F 10/02
See application file for complete search history.

(56) References Cited

U.S. PATENT DOCUMENTS

| | | | |
|---|---|---|---|
| 7,636,150 B1 * | 12/2009 | McCauley | G01S 7/4863 356/5.01 |
| 10,206,194 B1 * | 2/2019 | Haartsen | G01S 5/12 |
| 2011/0188027 A1 * | 8/2011 | Bamji | G01C 3/08 356/5.01 |
| 2015/0304534 A1 * | 10/2015 | Kadambi | H04N 5/2256 348/207.11 |
| 2017/0041589 A1 * | 2/2017 | Patil | G01S 17/36 |
| 2019/0018138 A1 * | 1/2019 | Warke | G01S 7/4817 |

* cited by examiner

Primary Examiner — Charlie Y Peng

(57) ABSTRACT

This invention relates to apparatus and methods for measuring the time-of-flight of a signal. The signal may be acoustic energy or electromagnetic energy such as x-ray, radio frequency, microwave, millimeter-wave, radar, and laser. Unlike unambiguous ranging devices that measures the phases of two or more signals to determine the time-of-flight and requires long averaging to achieve some degree of accuracy, this invention phase lock one or more transmitter signals to the corresponding received signals in predetermined phase relationships and measures the frequencies of one or more variable frequency oscillators having frequencies several times higher than the frequency of the transmitter signal to determined the time-of-flight with much higher accuracy.

13 Claims, 4 Drawing Sheets

HIGH RESOLUTION TIME-OF-FLIGHT MEASUREMENTS

FIELD OF THE INVENTION

The present invention relates to methods and apparatus for measuring the time-of-flight of a signal from a transmitter to a receiver. The methods and apparatus of this invention is applicable to devices that transmit acoustic or electromagnetic energy. Generally it applies to any device that uses the time-of-flight of a signal to make a measurement.

BACKGROUND OF THE INVENTION

Time-of-flight is a method used to measure the time it takes for a signal to travel from a transmitter to a receiver over a distance. The signal used with this method may be acoustic or electromagnetic energy; electromagnetic energy such as x-ray, radio frequency, microwave, millimeter-wave, radar, and laser. Time-of-flight can be used to measure distance, the velocity of a moving object or fluid, or the velocity of a signal over a known distance. It is use in devices such as ultrasonic flow meters, ranging equipments, radar, and navigation systems.

In prior art there are two fundamental methods for measuring time-of-flight; measuring the propagation time of a signal from a transmitter to a receiver (transit time method), and measuring the phase difference between two or more received signals (phase based method).

Ranging devices measure the time-of-flight of a signal from a transmitter to a target and back to a receiver. The time-of-flight and the velocity of the signal through a medium is used to determine the distance to the target.

Ultrasonic transit-time flow meters in prior art measure the time-of-flight of an acoustic pulse transmitted in both direction of fluid flow, and use the difference in the transit time to determine the fluid flow rate. The shape and response time of the pulse is crucial to measuring the time-of-flight with some degree of accuracy. To get good signal to noise ratio a response time between 50-100 pico-seconds and powerful precisely tuned transducers are required; making it relatively expensive. Prior art transit-time devices based on the speed of light require long averaging time and sub-nanosecond timing circuitry to measure distances with good resolution.

Some phase based method use a phase comparator to generate a voltage that is proportional to the phase and use a digital to analog converter to digitize the voltage to determine the phase. Other devices digitize the signal and perform a Fourier transform on the digitized data to determine the phase. The low resolution of analog to digital converters require long averaging time to improve accuracy, and Fourier transform requires intensive computation and increased power usage.

SUMMARY OF THE INVENTION

This present invention relates to apparatus and methods for high resolution time-of-flight measurement at low cost and low power. The object of this invention is accomplished by using at least one variable frequency oscillator to generate the transmitter signal and using the higher frequencies of the oscillator to measure the time-of-flight with much higher accuracy than prior art. One or more oscillators are controlled to phase lock the transmitter signals to the corresponding received signals at different frequencies that differs by a predetermined number of cycles within the time-of-flight, and the time-of-flight is determined based on the frequencies and the difference in the number of cycles.

For improved signal reception and detection the apparatus of this invention comprise sinusoidal signals to which the receiver is tuned to be principally sensitive, noise filtering circuitry, and noise detection circuitry for automatic receiver gain control; providing a high signal to noise ratio with minimum power. Sinusoidal signals can be used to drive transducers over a large range of frequency and bandwidth with no sacrifice in accuracy; thus eliminating the need to use expensive precisely tuned higher frequency transducers as in prior art. This invention does not require expensive sub-nanosecond timing circuitry in devices based on the speed of light as in prior art that rely on accurately detecting the arrival time of a pulse of energy.

An example of an apparatus and methods of this inventions is as follows: A transmitter signal having a predetermined frequency is transmitted to a receiver. The frequency is then controlled to phase lock a transmitter generated signal having no phase delay to the corresponding received signal. The frequency of the phase locked signal is determined to be $f_0$. The transmitter generated signal is then phase shifted by a fraction of a cycle $n_k$ and the transmitter signal relocks to the received signal in the $n_k$ phase relationship. The frequency of the relocked signal is determined to be $f_1$.

The time-of-flight is determined using the following relationships;

$$N - n_{d0} = t \cdot f_0;$$

$$N - n_{d1} - n_k = t \cdot f_1;$$

Where N is the unknown integral number of cycles within the unknown time-of-flight t, and $n_{d0}$ and $n_{d1}$ are frequency dependent fraction of a cycle delays due to circuitry, the transmitter, receiver, cables, etc; which can be determined by calibration means.

In many embodiments $n_{d0}$ and $n_{d1}$ are approximately equal ($n_d$) and solving for t and N reduces to:

$$t = n_k/(f_0 - f_1);$$

$$N = (n_k f_0)/(f_0 - f_1) + n_b;$$

For higher accuracy some embodiments of this invention may first determine N, and in subsequent time-of-flight measurement use N and one frequency measurement ($f_0$).

To further illustrate the invention, an example of a continuous wave laser ranging apparatus is presented. The apparatus has a system delay of ($n_d$=0.25 cycles). A laser signal is modulated at 10 MHz and transmitted to a target and back to a receiver. The frequency of the transmitter signal is controlled by a phase comparator to phase lock a transmitter generated phase signal (9) having a 0° phase delay to a receiver generated signal (14). The signals lock at frequency $f_0$=10.125 MHz (shown in FIG. 2). The phase signal (9) is delayed by ½ cycle and relocks at frequency $f_1$=9.375 MHz (shown in FIG. 3). (NOTE: may also relock at 10.875 MHZ).

The time of flight and the range are determined as shown below;

$$t = n_k/|f_0 - f_1|) = 0.5/(10,125,000 - 9,375,000) = 0.666666667 \text{ usec};$$

$$R = t \cdot v/2 = (0.666666667 \text{ usec}) \cdot (300000 \text{ km/sec})/2 = 100 \text{ m};$$

For a time interval of 100 msec and a variable frequency oscillator with a frequency that is 64 times that of the transmitter signal, the counter values are: $C_0$=64,800,000, $C_1$=60,000,000;

The range error for counter errors of +1 for one counter and a −1 for the other is determined below:

$$f=(64,800,000+1)/6.4=10,125,000.156;$$

$$f_1=(60,000,000-1)/6.4=9,374,999.8438;$$

$$t=0.5 1(10,125,000.156-9,374,999.8438)= 0.6666663889 \text{ usec};$$

$$R=t\cdot v/2=(0.6666663889 \text{ usec})\cdot(300000 \text{ km/sec})/ 2=99.999958335 \text{ m};$$

Error: 100 m−99.999958335 m=0.00004 m=0.04 mm;

To reduce the error, the integral number of cycles N can be determined and subsequent time-of-flights determined based on N and $f_0$ as shown below;

$$n=(n_k \cdot f_0)/(f_0-f_1)+n_d;$$

$$n=(0.5 \cdot 10,125,000.156)/(10,125,000.156-9,374, 999.8438)+0.25;$$

$$n=6.999;$$

$$N=\text{IntegralOf}(n+0.5)=7;$$

A one count error in $f_0$ would result in;

$$t=(N-n_d)/f_0=(7-0.25)/10,125,000.156=0.6666666564;$$

$$R=t\cdot v/2=(0.6666666564 \text{ usec})\cdot(300000 \text{ km/sec})/ 2=0.09999999846 \text{ km};$$

Error: (100−99.99999846) m=0.0000015 m=0.0015 mm;

It is to be understood that the above-described embodiments and illustrations are only illustrative of the applications of the principles of the invention and that various modifications may be made by those skilled in the art without departing from the spirit and scope of the invention.

BRIEF DESCRIPTION OF THE DRAWINGS

FIG. 11 illustrates an embodiment using two voltage controlled oscillators (VCO) for determining the time-of-flight.

DESCRIPTION OF THE PREFERRED EMBODIMENT

Figure 1:
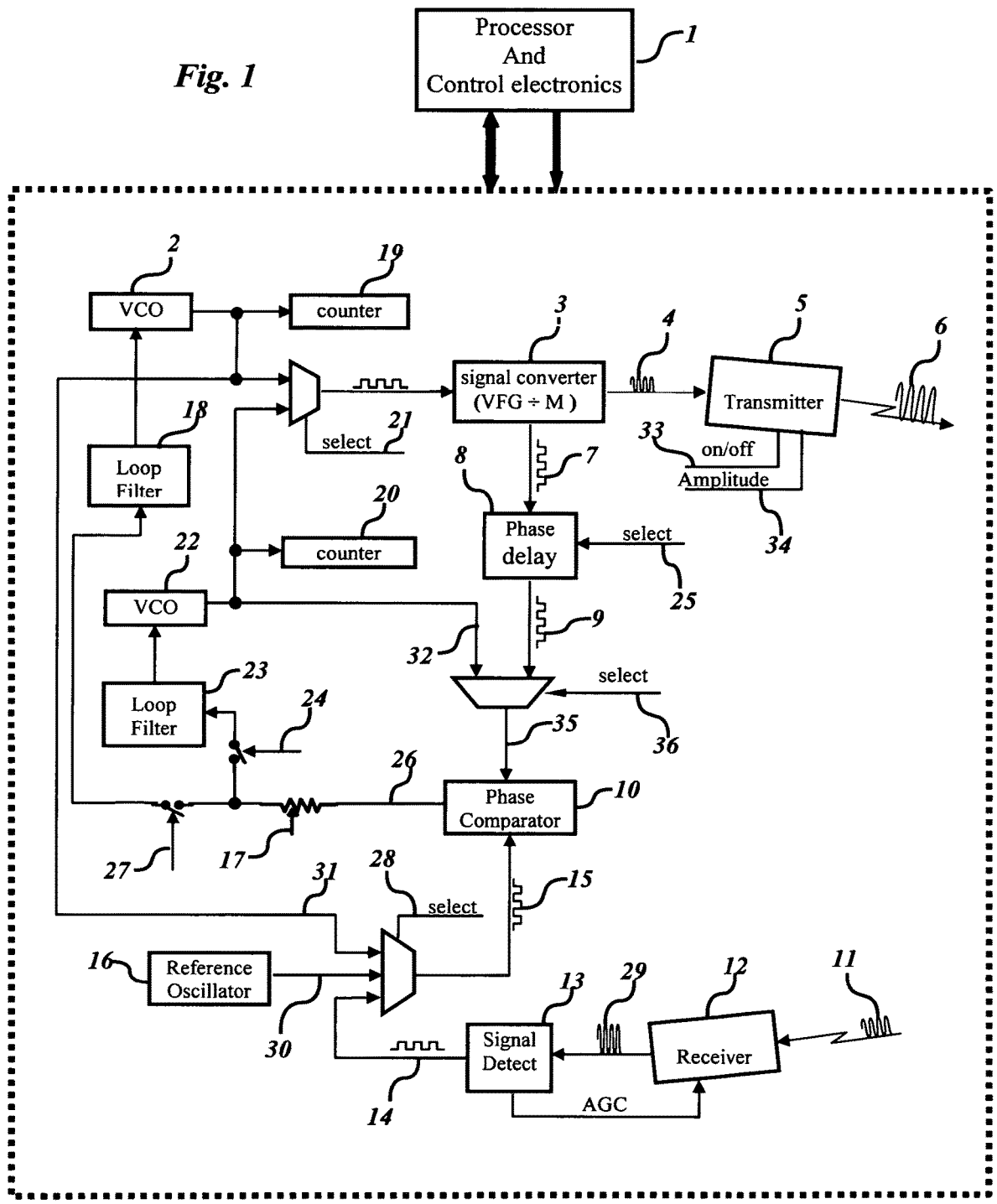

FIG. 1 illustrate embodiments that use two Voltage Controlled Oscillators (VCO) (2) and (22) for generating transmitter signals (6). The transmitter signal may be acoustic energy or electromagnetic energy. The output signals (31,32) of the VCOs are alternately selected (21) to apply to the signal converter (3) for providing signals (4) and (7) with frequencies M factors less than the frequency of the VCO, wherein signal (4) is used to drive transmitter (5), and signal (7) is used for phase comparison. The processor and control electronics (1) are operatively connected to provide and to receive signals for processing of the transmitter signals. Counters (19) and (20) and interval timers provided by the control electronics may be used by the processor to determine the frequency of the VCO. Phase select signal (25) and phase delay circuitry (8) provide two or more phase delays of signal (7) for providing predetermined phase relationship signals (9) as a first input (35) to a phase comparator (10). Signal (33) may be used to transmit bursts of energy or continues energy, and signal (34) to control the amplitude of the transmitter signal. A receiver (12) receives the transmitted signal (11) to produce receiver signal (29) which may be used by a signal detect circuitry (13) to detect signals at or above predetermined levels for: (a) adjusting the transmitter power output, (b) controlling the gain (AGC) of the receiver, (c) determining signal arrival, and (d) providing a receiver phase signal (14) as a second input (15) to the phase comparator (10). Phase comparator (10) compares the first input (35) to the second input (15) to provide a VCO control signal (26). A variable resistor (17) may be coupled for varying the response time of the voltage controlled oscillators. Loop filters (18) and (23) may use buffers, amplifiers, and voltage holding capacitors for properly coupling signal (26) to VCO (2) and (22). Signals (24) and (27) may close analog switches to enable control of the corresponding voltage control oscillator when the transmitted signal is being received. A reference oscillator (16) may be used for providing reference signal (30). Signals (36) and (28) may be used for selecting a first and a second input to the phase comparator. The first and second inputs are selected as follows:

A) signals (9) and (30) for controlling the first VCO (2) to generate a first transmitter signal with a predetermine frequency;
B) signals (32) and (31) for phase locking the second VCO (22) to the first VCO (2) to generate a second transmitter signal with the same frequency as the first transmitter signal;
C) signals (9) and (14) for phase locking the transmitter signal to the corresponding received signal.

Figure 2:
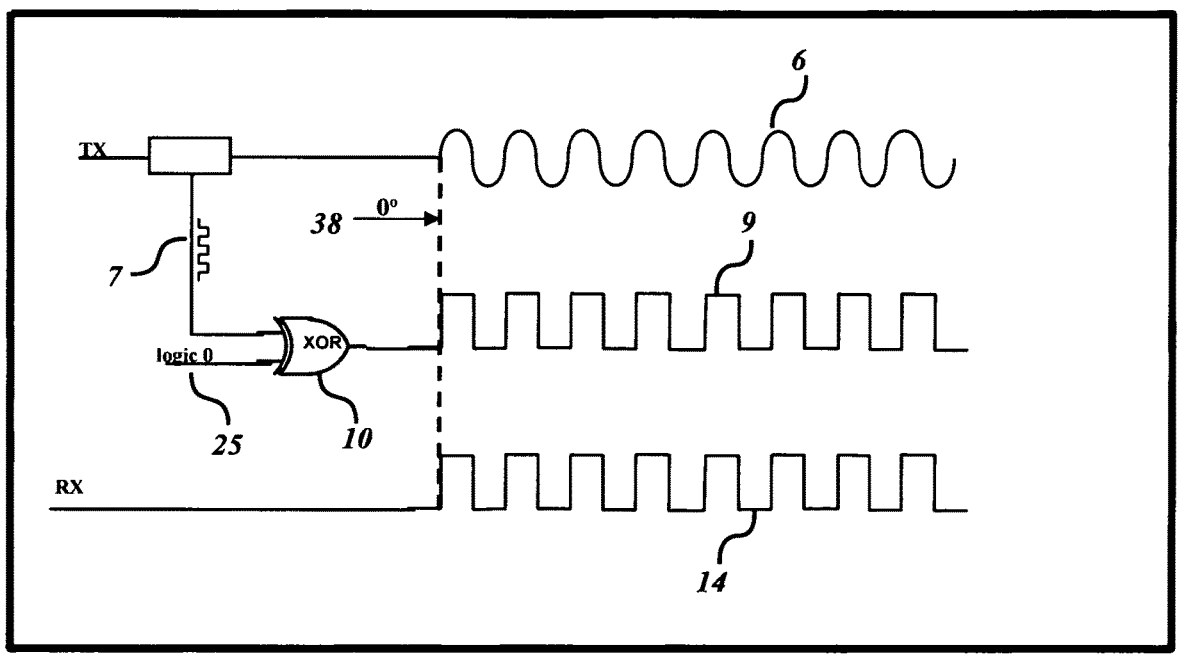
FIGS. 2 and 3 illustrate an XOR used for phase delays.
Figure 3:
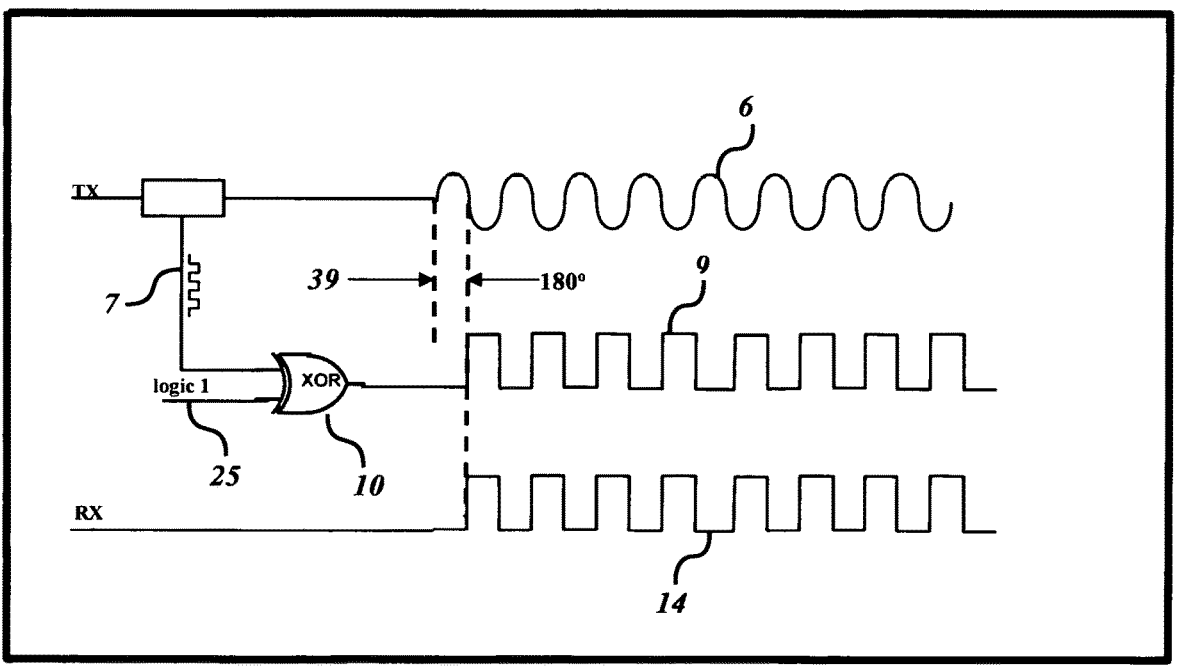

FIGS. 2 & 3 illustrates embodiments that may use an exclusive-OR (XOR) (10) for selecting phase delays. Phase select signal (25) may select 0° (38) or 180° (39) phase shifts of signal (7) to produce a transmitter phase signal (9). The transmitter phase signal is compared to a receiver phase signal (14) by the phase comparator to produce the selected phase lock relationship of the transmitter and receiver signals.

Figure 4:
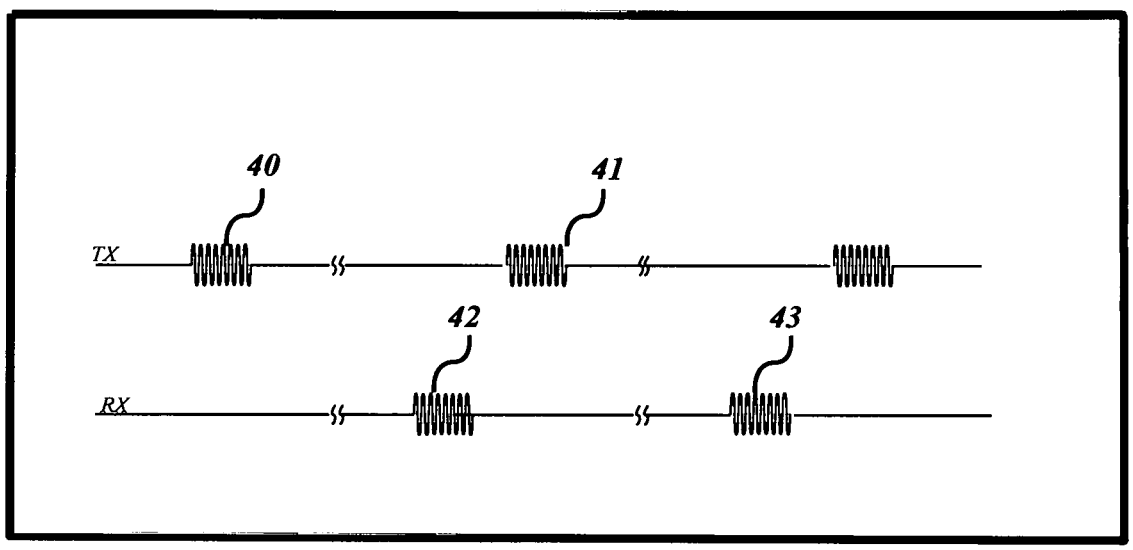
FIGS. 4 and 5 illustrate transmitting and receiving signals in bursts.

FIG. 4 illustrates alternately transmitting bursts of first (40) and second (41) signals where the first signal is received (42) before transmitting the second signal, and the sequence repeats after receiving the second signal (43).

Figure 5:
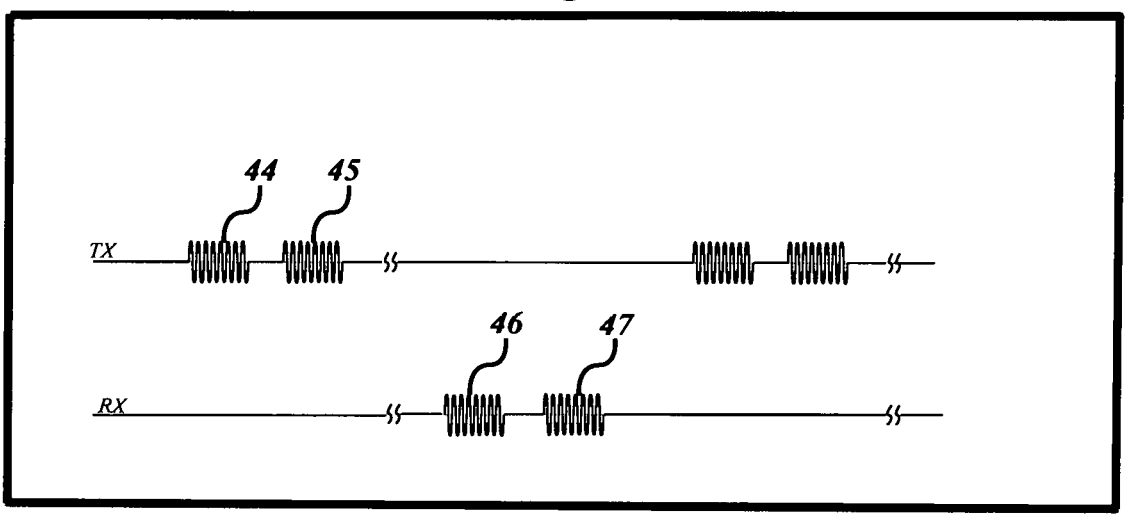

FIG. 5 illustrates alternately transmitting two signals (44) and (45) before receiving the corresponding signals (46) and (47).

Figure 6:
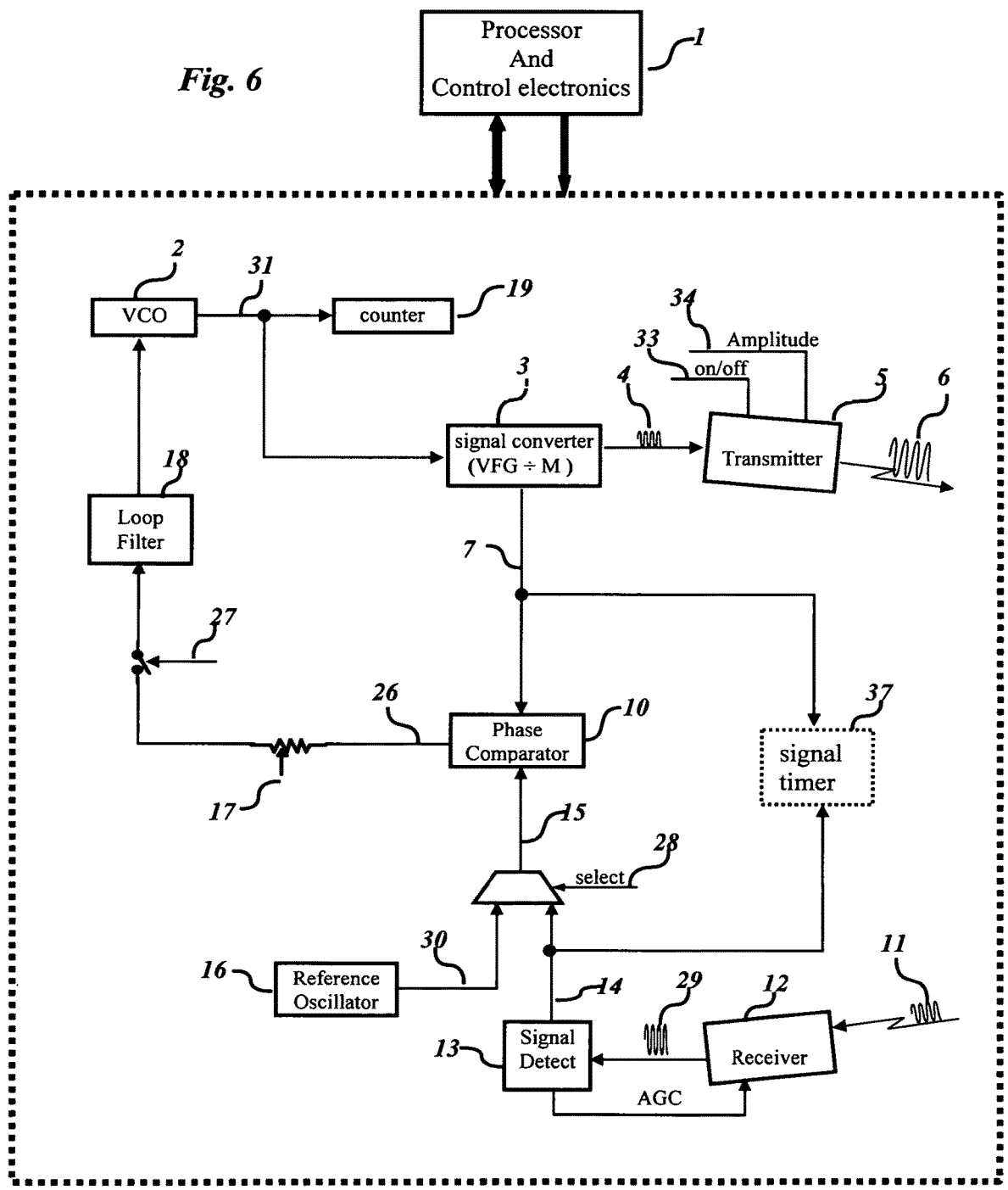
FIG. 6 illustrates an embodiment using one VCO and may also have a signal timer for making coarse time-of-flight measurement.

FIG. 6 illustrate embodiments that use one Voltage Controlled Oscillator (VCO) (2) to generate transmitter signals (6). The transmitter signal may be acoustic energy or electromagnetic energy. The processor and control electronics (1) are operatively connected to provide and to receive signals for processing of the transmitter signals. The VCO output signal (31) may be applied to the signal converter (3) to produce signals (4) and (7) with frequencies M factors less than the frequency of the VCO, wherein signal (4) is used to drive transmitter (5), and signal (7) is used as a first input to a phase comparator (10). Counter (19) and an interval timer provided by the control electronics may be used by the processor to determine the frequency of the VCO. Signal (33) may be used to transmit bursts of energy or continues energy, and signal (34) to control the amplitude of the transmitter signal. A receiver (12) receives the transmitted signal (11) to produce receiver signal (29) which may be used by a signal detect circuitry (13) to detect signals at or above predetermined levels for: (a) adjusting the transmitter power output, (b) controlling the gain (AGC) of the receiver, (c) determining signal arrival, and (d) providing a receiver phase signal (14) as a second input (15) to the phase comparator (10). The phase comparator compares the first input (7) to the second input (15) to provide a VCO control signal (26). A variable resistor (17) may be coupled for varying the response time of the voltage controlled oscillators. Loop filter (18) may use buffers, amplifiers, and voltage holding capacitors for properly coupling signal (26) to the VCO. Signal (27) may close an analog switch to enable control of the corresponding voltage control oscillator when the transmitted signal is being received. A reference oscillator (16) may be used for providing reference signal (30). Signal timer (37) may provide a timer for determining a coarse time-of-flight. Signals (28) may be used for selecting the second input as follows:

A) signal (30) for controlling the VCO to generate a first transmitter signal with a predetermine frequency, B) signal (14) for phase locking the transmitter signal to the corresponding received signal.

What is claimed is:

1. A method for measuring the time-of-flight of a signal comprising:
    a. transmitting transmitter signals (6) to a receiver (12), wherein the transmitter signals are generated by one or more high frequency variable frequency oscillators;
    b. receiving and processing said transmitter signals;
    c. controlling the frequencies of said frequency oscillators to phase lock the corresponding generated transmitter signal to the corresponding received signal to form at least first and second phase locked signals with frequencies that differ by a predetermined number of cycles within the time of flight;
    d. making frequency measurements of said variable frequency oscillators for determining the frequency of said phase locked signals;
    e. using said frequency measurements and said predetermined difference in number of cycles to measure at least one of a set of measurable factors from a group consisting of time-of-flight of said transmitter signal, velocity of said transmitter signal, range of a target, and velocity of said target.

2. A method for measuring the time-of-flight of a signal as recited in claim 1 wherein forming said first phase locked signal further comprise transmitting a transmitter signal having a predetermined initial frequency to said receiver then adjusting the frequency to phase lock said transmitter signal to the corresponding receiver signal in a first predetermined phase relationship.

3. A method for measuring the time-of-flight of a signal as recited in claim 1 wherein forming said second phase locked signal further comprise transmitting a transmitter signal having the same frequency and phase as said first phase locked signal then adjusting the frequency to phase lock said transmitter signal to the corresponding receiver signal in a second phase relationship that differs from the phase of the first locked signal by a predetermined fraction of a cycle.

4. A method for measuring the time-of-flight of a signal as recited in claim 1 wherein measuring the time of flight further comprise determining the integral number of cycles within the time of flight of a phase locked signal based on previous time-of-flight and frequency measurements, and using said integral number of cycles and the frequency of the phase locked signal to measure subsequent time of flights with higher accuracy.

5. Apparatus for measuring the time-of-flight of a signal comprising:
    a. at least one transmitter (5) disposed to transmit a transmitter signal (6) to a receiver (12);
    b. at least one receiver (12) disposed for receiving said transmitter signal;
    c. at least one variable frequency oscillator for generating said transmitter signal, wherein the frequency of said variable frequency oscillator further comprise a frequency that is several times higher than the frequency of said transmitter signal;
    d. means for controlling (10) at least one variable frequency oscillator to phase lock said transmitter signal to the corresponding received signal in predetermined phase relationships to form at least first and second phase locked signals having frequencies that differ by a predetermined number of cycles within the time-of-flight, wherein said phase relationship further comprise a transmitter phase signal (9) generated by said variable frequency oscillator, a receiver phase signal (14), and a phase shift circuit (8) for providing at least two selectable phase relationships between said transmitter and receiver phase signals;
    e. means for determining the frequency (19) of at least one variable frequency oscillator;
    f. at least one processor and control electronics (1) configured for processing said transmitter signals, and for measuring said time-of-flight based on said frequency measurements and said predetermined difference in number of cycles.

6. Apparatus for measuring the time-of-flight of a signal as recited in claim 5 wherein transmitting a transmitter signal further comprise said transmitter signal (6) selected from a group consisting of acoustic and electromagnetic energy.

7. Apparatus for measuring the time-of-flight as recited in claim 5 wherein means for controlling at least one variable frequency oscillator to form said first phase locked signal further comprise a phase comparator (10) receiving a first input signal provided by said variable frequency oscillator and a second input signal provided by a reference oscillator (16) for controlling said variable frequency oscillator to generate a transmitter signal having a predetermined initial frequency; and said phase comparator then comparing said transmitter and receiver phase signals (9,14) to phase lock the transmitter signal to the corresponding received signal in a predetermine phase relationship.

8. Apparatus for measuring the time-of-flight as recited in claim 5 wherein means for controlling at least one variable frequency oscillator to form said second phase locked signal further comprise changing the phase relationship (25) of said first phase locked signal by a predetermined fraction of a cycle to relock said first phase locked signal to the corresponding received signal in a second predetermined phase relationship.

9. Apparatus for measuring the time-of-flight as recited in claim 5 wherein means for controlling at least one variable frequency oscillator to form said second phase locked signal further comprise a circuit for selecting one of at least two variable frequency oscillators; alternately selecting (21) first and second variable frequency oscillators to transmit first and second transmitter signals to said receiver; alternately selecting (25) first and second phase relationships; using the first variable frequency oscillator to form said first phase locked signal; a phase comparator (10) receiving first and second input signals from the first and second variable frequency oscillators to phase lock said second transmitter signal to said first transmitter signal; and said phase comparator then receiving the transmitter phase signal (9) generated by the second variable frequency oscillator as first input and the corresponding receiver phase signal (14) as second input for further controlling said second variable frequency oscillator to form said second phase locked signal in said second phase relationship.

10. Apparatus for measuring the time-of-flight as recited in claim 5 wherein transmitting a transmitter signal to a receiver further comprise an input signal (4) provided by said variable frequency oscillator, a reference oscillator for providing a carrier signal, a modulator receiving said input signal to modulate said carrier signal for transmitting to said receiver, and a demodulator to demodulate the received signal (11) for providing a receiver signal (29) indicative of said input signal.

11. Apparatus for measuring the time-of-flight as recited in claim 5 wherein means for determining the frequency of at least one variable frequency oscillator further comprise at least one counter (19) for counting the cycles of said variable frequency oscillator to provide counter values at periodic intervals to determine said frequency.

12. Apparatus for measuring the time-of-flight as recited in claim 5 wherein means for controlling at least one variable frequency oscillator to phase lock the transmitter signal to the corresponding received signal in a predetermined phase relationship further comprise said apparatus configured for (a) comparing said transmitter and receiver phase signals by a phase comparator (10) to control the frequency; (b) varying the response time by a variable response circuit (17); (c) disabling and enabling control by circuits (27/24) operatively connected to receive signals from said receiver in combination with signals from circuitry for selecting a variable frequency oscillator; (d) applying a control signal with the required characteristics to the variable frequency oscillator by a loop filter (18/23); and (e) holding the control signal constant when disabled.

13. Apparatus for measuring the time-of-flight of a signal comprising:
   a. at least one transmitter (5) disposed to transmit a transmitter signal (6) to a receiver (12);
   b. at least one receiver (12) disposed for receiving said transmitter signal;
   c. at least one variable frequency oscillator having a frequency several times higher than the frequency of said transmitter signal for generating said transmitter signal;
   d. means for controlling (10) said variable frequency oscillator for providing an initial predetermined transmitter frequency and further controlling said variable frequency oscillator to phase lock said transmitter signal to the corresponding received signal to form a phase locked signal;
   e. means for measuring the frequency (19) of at least one variable frequency oscillator;
   f. timer circuit (37) for making coarse time-of-flight measurements;
   g. at least one processor (1) disposed for determining the integral number of cycles within the time-of-flight of said phase locked signal based on said coarse time measurements and said frequency measurements; and said processor using said integral number of cycles and said frequency measurements to make subsequent higher resolution measurement of at least one of a set of measurable factors from a group consisting of time-of-flight of said transmitter signal, velocity of said transmitter signal, range of a target, and velocity of a target.

\* \* \* \* \*